United States Patent [19]

Lauman

[11] Patent Number: 4,753,826

[45] Date of Patent: Jun. 28, 1988

[54] ABRASION-RESISTANT POLYMER COMPOSITION AND COATING

[75] Inventor: G. Fred Lauman, Chalfont, Pa.

[73] Assignee: Palmer International, Inc., Worcester, Pa.

[21] Appl. No.: 20,008

[22] Filed: Feb. 27, 1987

Related U.S. Application Data

[63] Continuation-in-part of Ser. No. 838,524, Mar. 11, 1986, abandoned.

[51] Int. Cl.$^4$ ............................. C08K 3/34; B05D 3/02
[52] U.S. Cl. ................................... 427/386; 428/220; 523/455; 523/466
[58] Field of Search ............... 427/386; 523/455, 466; 525/528; 428/220, 413

[56] References Cited

U.S. PATENT DOCUMENTS

| | | | |
|---|---|---|---|
| 3,174,977 | 3/1965 | Holberg et al. | 523/455 |
| 3,316,185 | 4/1967 | Reinking . | |
| 3,352,813 | 11/1967 | Hayes | 523/455 |
| 3,645,969 | 2/1972 | Harvey | 523/455 |
| 4,383,061 | 5/1983 | Neal et al. | 523/455 |
| 4,456,740 | 6/1984 | Holubka et al. | 525/528 |
| 4,507,412 | 3/1985 | Hickner et al. | 523/455 |
| 4,539,345 | 9/1985 | Hansen . | |

FOREIGN PATENT DOCUMENTS

| | | |
|---|---|---|
| 024811 | 3/1981 | European Pat. Off. . |
| 024501 | 3/1981 | European Pat. Off. . |
| 3004569 | 8/1981 | Fed. Rep. of Germany . |
| 2056458 | 3/1981 | United Kingdom . |

OTHER PUBLICATIONS

Dow Liquid Epoxy Resins, Form No. 190-224076, 1976.
Mobay Chemical Corporation, Product Information, C2-43-1, Desmocap 11A, (Product Code D-375).
Mobay Material Safety Data Sheet, Desmocap 11A, Product Code Number D-375, 1985.
Union Carbide Amines, Product Information, Polyglycoldiamine H-221, 1979.
Union Carbide, Material Safety Data Sheet, Product Name: Polyglycoldiamine H-221, 1979.
Cabot, Cab-O-Sil® N70-TS, Hydrophobic Fumed Silica, 1983.
Cabot, Cab-O-Sil® Technical Data, Cab-O-Sil® N70-TX, 1983.
Union Carbide Corporation, Specialty Chemicals Division, Material Saftey Data Sheet, Product Name: Union Carbide Organofunctional Silane A-1100, 1985.

*Primary Examiner*—Lewis T. Jacobs
*Attorney, Agent, or Firm*—Seidel, Gonda, Goldhammer & Abbott

[57] ABSTRACT

An abrasion resistant polymer and coating composition comprising from about 24 to 48 wt. % of a liquid epoxy resin, from about 24 to 48 wt. % of a blocked isocyanate prepolymer, from about 4.2 to 12 wt. % of a rheological additive, from about 10 to 14 wt. % of a curing agent, from about 1 to 4 wt. % of a plasticizer, and from about 0.1 to 0.6 wt. % of a silane. The coating composition is especially effective in resisting abrasion from solids entrained in fluids in fluid flow environments.

31 Claims, No Drawings

ABRASION-RESISTANT POLYMER COMPOSITION AND COATING

This is a continuation-in-part of my co-pending application Ser. No. 838,524 filed Mar. 11, 1986, now abandoned.

BACKGROUND OF THE INVENTION

This invention relates generally to abrasion-resistant polymer and coating compositions and, in particular, to polymers and coatings that resist abrasion caused by entrained solids in a fluid flow environment.

The need to move fluids containing entrained solids through conduits such as pipes or tubes is common in many industries. The interior of such conduits is often abraded as the fluid/solid combination moves through it. This is a particular problem in hydropower plants where water containing entrained solids is moved through draft tubes to rotate impeller blades and produce electricity. Over a period of time the abrasion from entrained solids can destroy an uncoated surface, or remove protective coatings. In the latter case, the conduit draft tubes must be shut down and recoated.

Need exists for a polymer and/or coating thereof that resists abrasion on the inner walls of conduits in a fluid flow environment, particularly when the fluid contains entrained solids.

SUMMARY OF THE INVENTION

This invention provides an abrasion resistant polymer composition and coating wherein the polymer and coating composition contains from about 24 to 48 wt. % of a liquid epoxy resin, from about 24 to 48 wt. % of a blocked isocyanate prepolymer, from about 4.2 to 12 wt. % of a rheological additive, from about 10 to 14 wt. % of a curing agent for the epoxide and the isocyanate, from about 1 to 4 wt. % of a plasticizer, and from about 0.1 to 0.6 wt. % of a surface modifying agent containing silane groups. Optionally the polymer composition and coating can contain up to about 2 wt. % of pigments to provide visual aid to confirm thorough mixing and up to about 2 wt. % of fillers or auxilliary agents to aid in handling. Preferably, from about 0.4 to 2 wt. % of fillers is used.

The polymer or coating is produced by blending a first and second component of the polymer composition and curing the blend. The first component is a mixture of from about 30 to 60 wt. % of a liquid epoxy resin, from about 30 to 60 wt. % of a blocked isocyanate prepolymer, and from about 4 to 10 wt. % of a rheological additive. The second component is a mixture of from about 50 to 70 wt. % of the curing agent, from about 5 to 20 wt. % of a plasticizer, from about 0.5 to 3 wt. % of a surface modifying agent, and from about 5 to 20 wt. % of a rheologicl additive. Four parts by weight of the first component are blended with one part by weight of the second component and the resulting blend is cured to produce the polymer. When the blend is applied to a surface or substrate and cured, a coating is produced.

In a preferred embodiment, the blended composition comprises about 36.4 wt. % of an epoxy resin; about 36.4 wt. % of a blocked isocyanate prepolymer; about 9.98 wt. % of a rheological additive; about 12.84 wt. % of the curing agent, preferably polyglycol diamine; about 2.88 wt. % of a plasticizer, preferably dibutyl phthalate; and about 0.36 wt. % of a surface modifying agent containing silane groups.

DETAILED DESCRIPTION OF THE INVENTION

It is to be understood that the following elements of the composition include all equivalents thereto as would be recognized in the art.

Any suitable liquid epoxy resin can be used provided that at least 50 wt. %, preferably 80 wt. %, most preferably 100% of the lquid epoxy resins used is a bisphenol A-epichlorohydrin epoxy resin. The preferred such resin has an epoxide equivalent weight of 182–190, a viscosity (cps at 25° C.) of 11,000 to 14,000 and a specific gravity (25/25° C.) of 1.16. The most preferred bisphenol A-epichlorohydrin resin is a diglycidyl ether of bisphenol A having the theoretical structure:

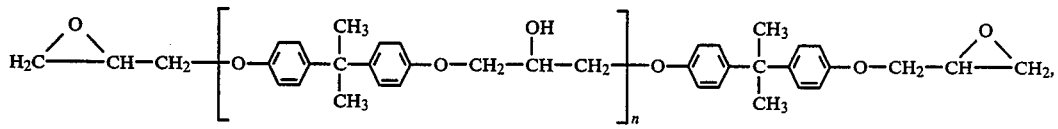

where n is 0.15. "D.E.R. 331," produced by Dow Chemical Corporation, Midland, Mich., is particularly preferred.

Examples of some liquid epoxy resins which can be used in quantities of up to about 50 wt. % of the liquid epoxy resin, preferably up to about 20 wt. % of the bisphenol A-epichlorohydrin resins of this invention, include low viscosity epoxy phenol novolac resins. The preferred such resin has an epoxy value (eq./100 g) of 0.54–0.58, a viscosity (cP at 25° C.) of 30,000 to 50,000 and the theoretical structure:

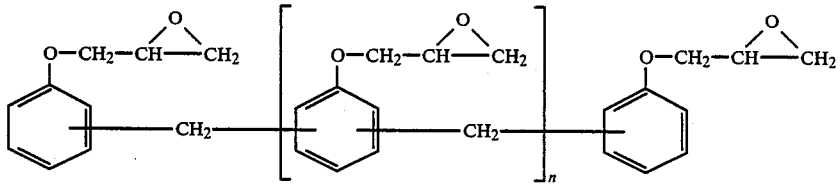

"Epoxy Resin XB 3337" having an epoxy functionality of 2.4 produced by Ciba-Geigy Corporation is particularly preferred.

Any suitable blocked isocyanate prepolymer can be used, particularly alkyl phenol blocked disocyanates and blocked isocyanate-terminated polyether prepolymers. A preferred alkyl phenol blocked prepolymer is an alkyl phenol blocked toluene diisocyanate having ether and blocked urethane groups. This prepolymer has an empirically determined equivalent weight of 860–1000, a specific gravity at 20° C. of 1.05 and a viscosity at 25° C. of 900±300 Pa·S. "Desmocap 11A," produced by Mobay Chemical Corporation, Pittsburgh, Penn. is particularly preferred. Another preferred blocked isocyanate is an alkyl phenol blocked toluene diisocyanate polyether prepolymer having a specific gravity at 20° C. of 1.04, an equivalent weight of 2470, a viscosity at 25° C. of 23,000–43,000 cps, and an available isocyanate content of 1.7%. "Desmocap 12" produced by Mobay Chemical Corporation, is particularly preferred.

For best results, at least about 80 wt. %, preferably 90 wt. % and most preferably 100% of the blocked isocyanate prepolymer should be comprised of the alkyl phenol blocked toluene diisocyanate prepolymer described above. The remainder of the blocked isocyanate prepolymer can be any blocked isocyanate prepolymer that is compatible with the alkyl phenol blocked toluene diisocyanate and that unblocks under curing conditions.

Any suitable curing agent for the epoxide and the isocyanate that reacts to cure those components at about the same rate under the curing conditions described herein can be employed. Generally aliphatic and cycloaliphatic amines such as alkyleneamines are used including diamino-ethers having terminal primary amino groups. Isophorone diamine, 3-aminomethyl-3, 5, 5-trimethylcyclohexylamine, 3, 3' dimethyl-4, 4'-diaminodicyclohexyl methane, polyglycol diamines, and the like can be used either alone or in combination. The most preferred alkyleneamine, referred to herein as polyglycol diamine, has a molecular weight of about 220 and the formula $NH_2CH_2CH_2CH_2O(CH_2CH_2O)_2CH_2CH_2CH_2NH_2$. "Polyglycoldiamine H-221," prouced by Union Carbide Corporation, New York, N.Y. is particularly preferred.

Any additive that will improve the flow and/or provide anti-sag properties to the paste or putty-like compositions of the invention may be used as the rheological additive of the invention. Preferably, a colloidal silica or hydrophobic fumed silica particularly surface modified with polymethyl silyl groups is employed. Surface modification is acheived by treating silica with an organosilicon to provide surface methyl groups in addition to surface hydroxyl groups. The rheological additive is important to maintain the shelf life and the physical properties or character of the paste or putty-like composition of the invention. "Cab-O-Sil N70TS," produced by Cabot Corporation, Tuscola, Ill. is a particularly preferred rheological additive. An organic derivative of a montmorillonite clay, treated with a quaternary ammonium chloride, for example, is also preferred. Most preferred is Bentone SD-2 rheological additive, a product of NL Industries, Inc.

Any suitable plasticizer may be employed in the composition and coating of this invention. While plasticizers are often thought of as imparting slip to a composition, they in fact promote the adhesion of the compositions and coatings of this invention. Some suitable plasticizers include phthalates such as alkyl benzyl phthalates, benzyl phthalates and dialkyl phthalates. Dibutyl phthalate is preferred.

Any suitable surface modifying agent that contains silane groups and can react with mineral fillers and the reactive materials of the coating to link the filler to the polymer backbone, particularly to the epoxy binder, and to the metal oxide of the substrate being coated, is preferred. Reactive silanes produce stronger compositions and promote adhesion to substrates, particularly metals such as aluminum and steel. Some suitable surface modifying agents that can be used include silanes, particularly organosilane esters known as gamma-aminoalkyltrialkoxysilanes. A preferred silane is gamma-aminopropyl triethoxysilane $(NH_2(CH_2)_3\ Si(OC_2H_5)_3)$ commercially available as "Silane A-1100" from Union Carbide Corporation, New York, N.Y.

Epoxy silanes, amino silanes, or both can be used in conjunction with the liquid epoxy resins, the curing agents, or both to provide the silane function making it unnecessary to employ a separate surface modifying agent reactant. The organo group (epoxy, amino) will react with the organic matrix and the silanol will react with the filler and/or the metal oxide surface of the substrate being coated. Some epoxy and amino silanes which can be used include gamma-glycidoxypropyl-trimethoxysilane, beta-(3, 4 epoxycyclohexyl)-ethyl-trimethoxy silane N-(beta-aminoethyl)gamma-aminopropyltrimethoxysilane, gamma-aminopropyltriethoxysilane, N'-beta-(aminoethyl)-N-(beta-aminoethyl)-gamma-aminopropyltrimethoxysilane, N-beta (aminoethyl)-gamma-aminopropyltrimethoxysilane, and the like and mixtures theroef. When an epoxy silane and/or amino silane is used, only that quantity is employed which will provide the polymer of the invention with 0.1 to 0.6% silane groups as described herein.

Any suitable auxiliary material, such as fillers, that will aid in the handling of the components or compositions of this invention may be employed but are not necessary for composition utility. Some such materials include talcs, clays, silicas, micas, and the like. A preferred filler is magnesium silicate, particularly that known as "Nytal 440," produced by R. T. Vanderbilt Company, Inc., Norwalk, Conn.

Pigments can be used to provide easy visual confirmation of thorough mixing but are not necessary for composition utility. Any first color pigment can be used in the first component, and any second color pigment can be used in the second component to be blended to produce the polymer composition and coating of the invention. Some suitable pigments include titanium dioxide, especially that commercially available as "R-902 Titanium Dioxide" from The Dupont Company, Wilmington, Del.; "Sunfast Blue" produced by Sun Chemical Corporation, Cincinnati, Ohio; tetrachloroisoindolinone or Pigment Yellow 109 produced as Irgazin Yellow 2GLTE by Ciba-Geigy Corporation. Yellow pigment in one component and blue in the other will yield a uniform green to indicate thorough mixing.

Although the coating composition of the invention can be applied to any surface that requires protection against abrasion as is, it is preferred that such surfaces are cleaned and surface contaminants such as scale, dirt, dust, grease, oil, water, or other foreign matter adverse to adhesion and cohesion are removed. The surface should then be roughened using any suitable means such as a grit blast, abrasion wheel, file, sanding paper or the like. Generally, the surface is then washed or wiped, preferably with a solvent that leaves no residue, and preferably at least twice, then dried completely. The surface is then coated with any suitable primer such as those well known for priming surfaces such as aluminum, steel, concrete, wood, plastics and the like. A preferred composition contains an epoxy polyamide as the primer compound wherein the epoxy is suitably any of those disclosed herein, particularly the diglycidyl ether of bisphenol A, and the polyamide is the reaction product of dimerized linoleic acid and diethylene triamine having an amine value of 230-246 and a viscosity of 20-42 poise at 75° C. A particularly preferred epoxy primer, is "PM-Epoxit Primer", a product of Palmer International Corporation.

The polymer composition of this invention can be applied at thicknesses of up to about 2 inches on vertical surfaces without slumping, and cured in place. Generally, curing is carried out at ambient temperature and pressure, usually from 15° C. to 60° C., preferably 20° C. to 60° C., most preferably 40° C. Typically, pressure is not a consideration and no external pressure is applied. Superior strength, durability and adhesion provides high abrasion resistance, flexibility and elongation so that the coatings of the invention can be power-sanded, ground, or machined forty-eight hours after application. The coatings exhibit virtually no shrinkage during or after cure, repel moisture, and have a tensile adhesion of not less than 1600 psi. The composition offers superior resistance to abrasion when coated on the inner walls of conduits through which liquids containing entrained solids must pass and, by virtue of its paste-like consistency, is particularly useful for patching and filling holes and pits in a substrate such as the inner walls of a conduit.

DETAILED DESCRIPTION OF A PREFERRED EMBODIMENT

In the following description all parts and percentages are by weight unless otherwise specified and eqivalents can be substituted for the elements employed.

To produce a preferred polymer composition and coating of this invention, two separate components are first prepared. The first component contains 45.5 parts of a bisphenol A-epichlorohydrin liquid epoxy resin having an epoxide equivalent of 182-190 and a viscosity of 11,000 to 14,100, 45.5 parts of an alkyl phenol blocked toluene diisocyanate having an equivalent weight of 860-1000, 0.4 parts of titanium dioxide pigment, and 8.6 parts of colloidal silica as a rheological additive. These materials can be mixed using any automatic mixing and dispensing equipment currently available as well as, standard paste mixing equipment such as a double arm mixer, planatary mixer, or dough mixer, until thoroughly blended. Mixing time may be varied as desired but from about 30 to 45 minutes is usually adequate.

The second component contains 64.2 parts of $NH_2CH_2CH_2CH_2O(CH_2CH_2O)_2CH_2CH_2CH_2NH_2$, 14 parts of dibutyl phthalate, 1.8 parts of gamma-aminopropyl triethoxysilane, 3.6 parts of magnesium silicate, 15.5 parts of colloidal silica as a rheological additive, and 0.9 parts of Sunfast Blue pigment. These materials can be mixed together in any standard mixing equipment as described above until thoroughly blended; about 30 to about 45 minutes is usually adequate.

The two components are combined immediately before the novel polymer composition of this invention is to be applied. At such time, four parts by weight of the first component are mixed with one part by weight of the second component until thoroughly blended as indicated by a uniform light blue color. Any standard mixing equipment as described above can be used.

The composition is a thixotropic paste having a pot life of about 40 minutes during which time it can be applied by any suitable means such as a trowel or spatula to the surface to be coated. A thickness of from about 1/16 inch to about 2 inches is generally adequate. The applied composition cures at ambient temperature in approximately 40 minutes.

The effectiveness of the coating compositions of this invention in protecting surfaces from abrasion due to entrained solids in fluid flow environments, such as in interiors of draft tubes employed in hydropower plants, can be demonstrated by the results of Taber abrasion tests. Specifically, using CS-17 wheels with a 1,000 gram load, an average wear loss of only 0.02 grams per 1,000 cycles, is observed while typical epoxy coating lose as much as much as ten times that weight.

The present invention may be embodied in other specific forms without departing from the spirit or essential attributes thereof and, accordingly, reference should be made to the appended claims, rather than to the foregoing specification, as indicating the scope of the invention.

We claim:

1. An abrasion resistant polymer composition comprising from about 24 to 48 wt. % of a liquid epoxy resin, from about 24 to 48 wt. % of a blocked isocyanate prepolymer, from about 4.2 to 12 wt. % of a rheological additive, from about 10 to 14 wt. % of a curing agent for the epoxide and the isocyanate, from about 1 to 4 wt. % of a plasticizer, and from about 0.1 to 0.6 wt. % of a surface modifying agent containing silane groups.

2. The polymer composition of claim 1 comprising about 36.4 wt. % of the epoxy resin, about 36.4 wt. % of the blocked isocyanate prepolymer, about 9.98 wt. % of the rheological additive, about 12.84 wt. % of the curing agent, about 2.88 wt. % of the plasticizer, and about 0.36 wt. % of the surface modifier.

3. The polymer composition of claim 1 comprising from about 24 to 48 wt. % epoxy resin, from about 24 to 48 wt. % blocked isocyanate prepolymer, from about 4.2 to 12 wt. % rheological additive, from about 10 to 14 wt. % polyglycol diamine, from about 1 to 4 wt. % dibutyl phthalate, and from about 0.1 to 0.6 wt. % silane.

4. The polymer composition of claim 3 comprising from about 36.4 wt. % epoxy resin, about 36.4 wt. % blocked isocyanate prepolymer, about 9.98 wt. % rheological additive, about 12.84 wt. % polyglycol diamine, about 2.88 wt. % dibutyl phthalate, and about 0.36 wt. % silane.

5. An abrasion resistant coating composition comprising from about 24 to 48 wt. % of a liquid epoxy resin, from about 24 to 48 wt. % of a blocked isocyanate prepolymer, from about 4.2 to 12 wt. % rheological additive, from about 10 to 14 wt. % of curing agent for the epoxide and the isocyanate, from about 1 to 4 wt. % of a plasticizer, and from about 0.1 to 0.6 wt. % of a surface modifying agent containing silane groups.

6. The coating composition of claim 5 comprising about 36.4 wt. % of the epoxy resin, about 36.4 wt. % of the blocked isocyanate prepolymer, about 9.98 wt. % of the rheological additive, about 12.84 wt. % of the curing agent, about 2.88 wt. % of the plasticizer, and about 0.36 wt. % of the surface modifier.

7. The coating composition of claim 5 comprising from about 24 to 48 wt. % of epoxy resin, from about 24 to 48 wt. % of blocked isocyanate prepolymer, from about 4.2 to 12 wt. % if rheological additive, from about 10 to 14 wt. % of polyglycol diamine, from about 1 to 4 wt. % of dibutyl phthalate, and from about 0.1 to 0.6 wt. % of silane.

8. The coating composition of claim 5 comprising from about 36.4 wt. % of epoxy resin, about 36.4 wt. % of blocked isocyanate prepolymer, about 9.98 wt. % of rheological additive, about 12.84 wt. % of polyglycol diamine, about 2.88 wt. % of dibutyl phthalate, and about 0.36 wt. % of silane.

9. The coating composition of claim 5 containing up to about 2 wt. % pigment.

10. The coating composition of claim 5 containing up to about 2 wt. % magnesium silicate.

11. The coating composition of claim 8 containing from about 0.4 to 2. wt. % magnesium silicate.

12. The coating composition of claim 5 wherein at least about 50 wt. % of the liquid epoxy resin is a bisphenol A-epichlorohydrin epoxy resin.

13. The coating composition of claim 5 wherein at least about 80 wt. % of the liquid epoxy resin is a bisphenol A-epichlorohydrin epoxy resin.

14. The coating composition of claim 5 wherein at least about 80 wt. % of the blocked isocyanate prepolymer is an alkyl phenol blocked toluene diisocyanate.

15. The coating composition of claim 5 wherein at least about 90 wt. % of the blocked isocyanate prepolymer is an alkyl phenol blocked toluene diisocyanate.

16. The coating composition of claim 5 wherein the silane is an epoxy or an aminosilane.

17. An abrasion resistant coating comprising the reaction product of from about 24 to 48 wt. % of a liquid epoxy resin, from about 24 to 48 wt. % of a blocked isocyanate prepolymer, and from about 10 to 14 wt. % of and curing agent for the epoxide and the isocyanate; and from about 4.2 to 12 wt. % of a rheological additive, from about 1 to 4 wt. % of a plasticizer, from about 0.1 to 0.6 wt. % of silane, and auxilliary material.

18. The coating of claim 17 wherein the epoxy resins is a diglycidyl ether of bisphenol A, the blocked isocyanate is an alkyl phenol blocked toluene diisocyanate, the curing agent is an alkyleneamine having the formula $NH_2CH_2CH_2CH_2O(CH_2CH_2O)_2CH_2CH_2CH_2NH_2$, the rheological additive is colloidal silica, the plasticizer is dibutyl phthalate, the silane is gamma-aminopropyltriethoxysilane, and the auxiliary material is magnesium silicate.

19. The coating of claim 17 wherein up to 50% of the epoxy resin is a low viscosity epoxy phenol novolac resin.

20. The coating of claim 17 wherein up to 20% of the blocked diisocyanate is a blocked isocyanate prepolymer compatible with the alkyl phenol blocked toluene diisocyanate.

21. The coating of claim 17 wherein the silane is an epoxy silane.

22. The coating of claim 17 wherein the curing agent is an epoxy amine.

23. A method of producing an abrasion resistant coating composition, said method comprising:
(a) mixing from about 30 to 60 wt. % epoxy resin, from about 40 to 60 wt. % blocked isocyanate prepolymer, and from about 4 to 10 wt. % rheological additive to produce a first portion of said ccoating;
(b) mixing from about 50 to 70% wt. % polyglycol diamine, from about 5 to 02 wt. % dibutyl phthalate, from about 0.5 to 3 wt. % silane, and from about 5 to 20 wt. % rheological additive to produce a second portion of said coating; and
(c) mixing four parts of the first portion of said coating with one part of the second portion of said coating to produce the coating composition.

24. A method for producing an abrasion resistant coating which comprises:
(a) mixing from about 30 to 60 wt. % of a liquid epoxy resin, from about 30 to 60 wt. % of a blocked isocyanate prepolymer, and from about 4 to 10 wt. % of rheological additive to produce a first portion of said coating;
(b) mixing from about 50 to 70 wt. % of a curing agent for the epoxide and the diamine, from about 5 to 20 wt. % of a plasticizer, from about 0.5 to 3 wt. % of a silane, and from about 5 to 20 wt. % of a rheological additive to produce a second portion of said coating;
(c) mixing four parts of the first portion of said coating with one part of the second portion of said coating to produce a coating composition;
(d) applying the composition to a surface; and
(e) curing the composition to produce the coating.

25. The method of claim 24 wherein the first portion comprises about 45.50 wt. % of the epoxy resin, about 45.50 wt. % of the blocked isocyanate prepolymer, and about 8.60 wt. % of the rheological additive; the second portion comprises about 64.20 wt. % of the curing agent, about 14.00 wt. % of the plasticizer, about 1.80 wt. % of the silane, and about 15.50 wt. % of the rheological additive.

26. The method of claim 24 wherein the portions additionally contain a member selected from the group consisting of pigments, mineral fillers, and mixtures thereof.

27. The method of claim 24 wherein the coating is applied to the surface at a thickness of from about 1/6 to 2 inches.

28. The method of claim 24 wherein the composition is cured at ambient temperature.

29. The method of claim 24 wherein the epoxy resin is a diglycidyl ether of bisphenol A, the blocked isocyanate is an alkyl phenol blocked toluene diisocyanate, the curing agent is an alkylene amine havine the formula $NH_2CH_2CH_2CH_2\ O(CH_2CH_2O)_2CH_2CH_2CH_2NH_2$, the rheological additive is colloidal silica, the platicizer is dibutyl phthalate, the silane gamma-aminopropyltriethoxysilane, and the second portion contains magnesium silicate.

30. The method of claim 29 wherein the first and second portions contain a pigment.

31. The method of claim 24 wherein the surface to which the composition is applied is coated with a primer.

* * * * *